United States Patent [19]

Craft

[11] 3,840,174

[45] Oct. 8, 1974

[54] PRECISION DIGITAL INTERPOLATOR

[75] Inventor: Richard Allan Craft, Cinnaminson, N.J.

[73] Assignee: RCA Corporation, New York, N.Y.

[22] Filed: May 29, 1973

[21] Appl. No.: 364,540

[52] U.S. Cl........ 235/151.32, 235/92 CC, 235/92 T, 324/187, 328/48, 343/7.3

[51] Int. Cl.......................... G06f 15/20, G04f 11/06

[58] Field of Search..... 235/151.31, 151.32, 92 MT, 235/92 DN, 92 T, 92 FQ, 92 CC, 151.3; 324/187; 328/41, 42, 48, 129; 343/7.3

[56] References Cited

UNITED STATES PATENTS

| | | | |
|---|---|---|---|
| 3,505,594 | 4/1970 | Tarczy-Hornoch et al. | 324/187 |
| 3,611,134 | 10/1971 | McDowell | 324/187 |

*Primary Examiner*—Malcolm A. Morrison
*Assistant Examiner*—Jerry Smith
*Attorney, Agent, or Firm*—Edward J. Norton; Carl M. Wright

[57] ABSTRACT

A clock signal of a first frequency is applied to a first binary counter. The first counter provides an output signal after counting to a predetermined binary number. The output signal causes a second clock signal, of a second frequency, to be applied to a second counter. The second counter provides a second output signal after counting to a binary number which is the complement of the predetermined binary number. The temporal position of the second output signal is varied, in steps equal to the difference in the periods of the two clocks, by varying the predetermined binary number.

2 Claims, 1 Drawing Figure

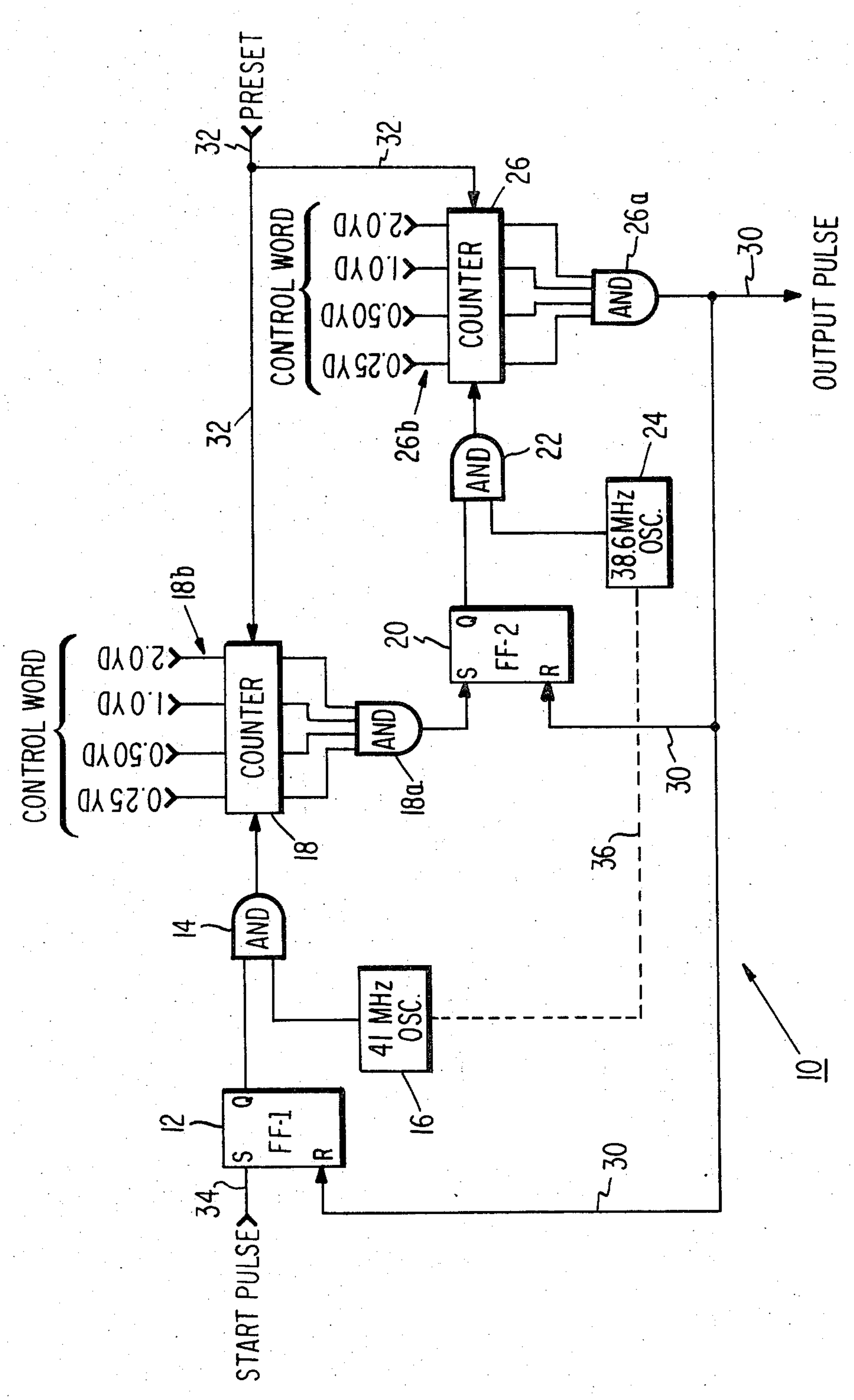
PRESET
CONTROL WORD
2.0 YD
1.0 YD
0.50 YD
0.25 YD
COUNTER
AND
OUTPUT PULSE
38.6 MHz OSC.
41 MHz OSC.
FF-1
FF-2
S
Q
R
START PULSE
10
12
14
16
18
18a
18b
20
22
24
26
26a
26b
30
32
34
36

PRECISION DIGITAL INTERPOLATOR

BACKGROUND OF THE INVENTION

The present invention relates to apparatus for providing digital pulses having high positional granularity using relatively low frequency logic circuitry, and, more particularly, to a precision digital interpolator using two relatively low frequency clock sources.

In the prior art, accurate means to measure the time elapsed between two events, such as two pulses, are known. One technique or system for precisely measuring the time interval between two pulses, referred to as vernier measurement, consists of using two stable oscillators, a coincidence detector, gating and logic circuitry, and two counters that accurately display the time difference between the two events or pulses. In this system, the first pulse starts the first oscillator and its associated counter. The second pulse stops the first counter and starts the second oscillator and its counter. When a coincidence between the clocks occurs, the counting operation ceases. Accordingly, the sum of the two counter readings is used to provide an accurate indication of the time elapsed between the two pulses. One example of a system utilizing this vernier principle, for time interval measurement, is described in Tanzman, "High Accuracy Time Interval Measurements", *Electronic Industries*, January 1959.

On the other hand, it is often desirable to provide a digital pulse with fine positional granularity, with reference to a first event, with equally high accuracy. An example of one such use of positional digital data is in radar range tracking systems for generation of fine-granularity range position gates. In the prior art, positionally precise pulses have been provided by means of correspondingly high-frequency clock sources and associated logic circuitry. In those prior art systems where relatively low-frequency clocks and correspondingly low-frequency logic circuitry have been used, precision tapped delay lines have been utilized to perform this function.

In the present invention, digital pulses with fine positional granularity are provided without necessitating high-frequency logic circuitry or precision delay lines.

SUMMARY OF THE INVENTION

Briefly, the present invention provides a digital interpolator comprising a first and second source of clock signals of different frequencies, and first and second counters. The first counter is responsive to the first clock source to provide a first output signal after a predetermined number of clock signals have been counted. The second counter is responsive to the first output signal and the second clock source to provide a second output signal after a second predetermined number of clock signals have been counted. The temporal position of the second output signal is varied, in granular steps related to the difference in the periods of the two clock sources, by varying one or both of the predetermined counting periods.

BRIEF DESCRIPTION OF THE DRAWING

The advantages of this invention will become more readily appreciated as the same becomes better understood by reference to the following detailed description when taken in conjunction with the accompanying drawing wherein:

The single FIGURE is a schematic diagram of a precision digital interpolator in accordance with one embodiment of the present invention.

DETAILED DESCRIPTION

The precision digital interpolator 10 includes a first flip-flop 12 having set (S) and reset (R) inputs, and a Q output. The Q output of flip-flop 12 is coupled to a first input of AND gate 14. The second input of AND gate 14 is coupled to the output of oscillator 16. The output of AND gate 14 is coupled to a clock signal input of a counter 18.

Counter 18 includes preset inputs generally shown at 18*b*. The outputs of counter 18 are shown coupled to an AND gate 18*a*. AND gate 18*a* is arranged in a known decoding configuration. Accordingly, the output of AND gate 18*a* provides an output signal after a predetermined number of clock pulses have been counted by counter 18. Counter 18 may be programmed to start counting pulses from a predetermined binary number or control word by appropriately presetting the predetermined control word into counter 18 by way of inputs 18*b*.

The output of AND gate 18*a* is coupled to the set (S) input of a flip-flop 20. The Q output of flip-flop 20 is coupled to a first input of AND gate 22. The second input of AND gate 22 is coupled to the output of a second oscillator 24. The output of AND gate 22 is coupled to a clock signal input of a second counter 26. The outputs of counter 26 are coupled as inputs to gate 26*a* which in turn provides an output on lead 30 when a predetermined number of pulses have been counted by counter 26. Counter 26 is provided with preset inputs generally designated at 26*b*. Accordingly, counter 26 may also be programmed in accordance with a predetermined control word by way of inputs 26*b*.

Output lead 30 is also coupled to the reset (R) inputs of flip-flops 12 and 20. A preset input is provided on lead 32 which is in turn coupled to counters 18 and 26. In this regard, a preset signal on lead 32 will cause a predetermined binary number to be preset into counters 18 and 26 in accordance with the control word respectively present at 18*b* and 26*b*. Finally, a start pulse input is provided on lead 34 which is coupled to the set (S) input of flip-flop 12.

For illustrative purposes, the operation of precision digital interpolator 10 will be described in terms of a typical radar range tracking system. Accordingly, oscillators 16 and 24 have been arbitrarily designated as having output frequencies of 41 and 38.6 MHz., respectively. It is known that electromagnetic waves in the radar spectrum travel at a velocity of 1 radar mile in 12.2 microseconds. One skilled in the radar art will recognize that a radar mile is taken to be 2,000 yards. Accordingly, the period of a 41 MHz clock signal corresponds to 4 yards. Further, a 38.6 MHz. clock signal has a period corresponding to 4.25 yards. Thus, the period difference between the clock frequencies shown in the drawing corresponds to 0.25 yards.

Assuming initially that a control word is applied to counter 18 at inputs 18_b_ and the complement of this predetermined binary control word number is applied to counter 26 at inputs 26_b_, the operation of interpolator 10 is as follows. An appropriate signal on preset lead 32 causes the predetermined control words to be programmed into counters 18 and 26. Thereafter, a start pulse applied to the S input of flip-flop 12 causes its Q output to provide a logic 1 to the first input of AND gate 14. Thereafter the output of oscillator 16 is gated into the clock signal input of counter 18. Counter 18 starts counting from the preset number or control word until a specific binary count is decoded by AND gate 18_a_. After decoding, AND gate 18_a_ sets flip-flop 20 causing its Q output to provide a logic 1 to the first input of AND gate 22. Thereafter, the output of oscillator 24 is gated into the clock signal input of counter 26. Counter 26 starts counting from its preset number or control word and a specific binary count is similarly decoded by AND gate 26 to provide an output pulse on lead 30. The output pulse on lead 30 resets flip-flops 12 and 20 thereby preparing interpolator 10 for another sequence.

It should now be appreciated that if, from the occurrence of the start pulse on lead 34, counter 18 counts M pulses before starting oscillator 24, and counter 26 then counts N pulses before the output pulse is provided on lead 30, the range distance from the start pulse to the output may be expressed as (M × 4 yds.) + (N × 4.25 yds.). Now, if counter 18 is programmed to count one less pulse and counter 26 is programmed to count one more pulse, the range distance will be (M − 1) × 4 yds. + (N + 1) × 4.25 yds., which is equal to (M × 4 yds.) + (N × 4.25 yds.) + 0.25 yds. Thus, the corresponding range gate range position has been increased by 0.25 yds. Similarly, by changing the counts by two pulses the output pulse position changes by 0.5 yds. The actual number of pulses counted by counters 18 and 26 is controlled by the four-bit binary control word applied respectively to inputs 18_b_ and 26_b_. The four individual bits of these control words have range equivalent values of 0.25, 0.5, 1.0 and 2.0 yds. Accordingly, the output pulse provided on lead 30 can be controlled to any one of 16 0.25 yd. steps within a 4 yd. period which is also the period of the 41 MHz. clock 16.

As noted above, counter 18 may be programmed to count a predetermined number of pulses while counter 26 may be programmed to count a number of pulses which is the complement of the number of pulses counted by counter 18. Such a complement relationship facilitates the use of a common control word for both counters. For example, if AND gate 18_a_ is arranged to decode an all-logic-1's output using counter 18 as an UP counter and AND gate 26_a_ is arranged to decode an all-logic-0's output, using counter 26 as a DOWN counter a single control word may be used to preset both counters —simultaneously or otherwise. In any event, it will be understood by those skilled in the art that the desired control word, or words, may be provided by conventional means such as an external shift register, another counter, a mechanical switch, or any other suitable means.

As shown in the drawing, oscillators 16 and 24 may be intercoupled by gating means 36 so that the first clock signal counted by counter 26, during each operational sequence of interpolator 10, is in phase with the last clock signal counted by counter 18. Accordingly, any potential output pulse positional error, caused by a phase disparity between the two clock sources, can be effectively avoided.

It will be appreciated by those skilled in the art that the position granularity or steps provided by interpolator 10 may be altered by changing the relative frequencies of clocks 16 and 24. For example, by selecting a frequency of 39.8 MHz. for oscillator 24, the output pulse generated on lead 30 may be varied in 16 0.125 yd. steps within a 2 yard segment of the period of the 41 MHz. oscillator 16. Further, by using a different binary word length for counter 18 and 26, the total number of position steps within the period of oscillator 16 may also be varied. For example, by selecting a 5-bit binary word count, 32 0.25 yd. steps can be provided within an 8 yd. period.

In accordance with the present invention, interpolator 10 may be used, for example, in a typical radar range tracking system. In this example, the output pulse on lead 30 may be used to start a range gate or window with 0.25 yd. positional granularity which allows return signals to be received only during this window. When used in this manner, each output pulse on lead 30, in turn, triggers means, such as a monostable multivibrator, to provide the desired window. Further, the start pulse applied to lead 34 is typically derived from the means which control the radar output pulse. It will be appreciated that the start pulse may be derived from "coarse range" circuitry—having, for example, a granularity of 4 yds.—such as is normally provided in the pulse-repetition frequency (PRF) circuitry associated with the radar transmitter.

In accordance with the teachings of the present invention a digital output pulse having fine positional granularity is provided without necessitating high-frequency clock sources and correspondingly high-frequency logic circuitry. For example, in the exemplary embodiment a 0.25 yd. granularity output pulse is provided using a 41 MHz. clock source and therefore, logic circuitry of a corresponding speed. However, the 0.25 yd. output pulse, in turn, corresponds to a 16 × 41 MHz. (or 656 MHz.) clock source which would, accordingly, require logic circuitry operational at a correspondingly high-speed.

What has been taught then is a precision digital interpolator for generating digital pulses with a fine positional granularity without necessitating high-frequency clock sources and associated logic circuitry. In one example, the present invention facilitates, notably, a range tracking gate for range tracking radar systems.

What is claimed is:

1. A digital interpolator comprising:

first source of clock signals of a first given frequency;

second source of clock signals of a second given frequency;

first and second counters;

wherein said first counter is responsive to said signals from said first clock source to provide a first output signal after a first predetermined number of clock signals has been counted in said first counter, said second counter is responsive to said signals from said second clock source for providing a second output signal after a second predetermined number of clock signals has been counted in said second counter, wherein the temporal position of said second output signal is a function of the difference in the periods of said clock signals and the relative values of said first and second predetermined numbers, and said first and second predetermined numbers are binary numbers, said second binary number being the complement of said first binary number;

first input means coupling said first counter to said first clock source and responsive to a start signal for applying said clock signals from said first clock source to said first counter in response to said start signal, said input means comprising a first flip-flop having a set input, a reset input and an output, and a first logical AND gate having first and second inputs and an output, said set input being coupled to receive said start signal, said reset input being coupled to receive said second output signal and said output of said first flip-flop being coupled to said first input of said first gate, said first clock source being coupled to said second input of said first gate and said output of said first gate being coupled to said first counter; and second input means coupling said first counter to said second counter and responsive to said first output signal for applying said clock signals from said second clock source to said second counter in response to said first output signal, said second input means comprising a second flip-flop having a set input, a reset input and an output, and a second logical AND gate having first and second inputs and an output, said set input of said second flip-flop being coupled to receive said first output signal, said reset input of said second flip-flop being coupled to receive said second output signal and said output of said second flip-flop being coupled to said first input of said second gate, said second clock source being coupled to said second input of said second gate, and said output of said second gate being coupled to said second counter.

2. The combination comprising:

first and second clock pulse means for producing pulses at different rates;

first and second counter means, each for counting first and second certain numbers of pulses at an input means and producing an output signal in response to counting said certain numbers of pulses;

first control means responsive to a control signal and said output signal from said second counter for coupling the pulses from the first clock means to the input means of said first counter during the time interval between said control signal and said output signal from the second counter; and second control means responsive to the output signals of said first and second counters for coupling the pulses from the second clock means to the input means of said second counter during the time interval between the output signals of said first and second counters.

* * * * *